United States Patent
Shimo et al.

(10) Patent No.: US 9,897,059 B2
(45) Date of Patent: Feb. 20, 2018

(54) DIESEL ENGINE

(71) Applicant: Mazda Motor Corporation, Aki-gun, Hiroshima (JP)

(72) Inventors: Daisuke Shimo, Hiroshima (JP); Sangkyu Kim, Higashihiroshima (JP); Kazunori Hirabayashi, Hiroshima (JP); Makoto Namba, Kure (JP); Masahiro Miyazaki, Hiroshima (JP); Yudai Kato, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 14/720,589

(22) Filed: May 22, 2015

(65) Prior Publication Data

US 2015/0354519 A1     Dec. 10, 2015

(30) Foreign Application Priority Data

Jun. 9, 2014 (JP) ................................ 2014-118971

(51) Int. Cl.
*F02M 61/18* (2006.01)
*F02M 61/04* (2006.01)
(Continued)

(52) U.S. Cl.
CPC ..... *F02M 61/1806* (2013.01); *F02B 23/0645* (2013.01); *F02B 23/0651* (2013.01);
(Continued)

(58) Field of Classification Search
CPC ............ F02M 61/1806; F02M 61/1846; F02B 23/0645; F02B 23/0651; F02B 23/0672
(Continued)

(56) References Cited

U.S. PATENT DOCUMENTS 3,559,892 A * 2/1971 De Luca ................ F02M 45/08
            239/533.4
5,449,121 A * 9/1995 El-Darazi .......... F02M 61/1806
            239/533.12
(Continued)

FOREIGN PATENT DOCUMENTS

AT          007204 U1    11/2004
CH          705454 A1     3/2013
(Continued)

OTHER PUBLICATIONS

Schulze, T., "Untersuchung des Einflusses der Spritzlochgeometrie der Einspritzduse auf die dieselmotorische Gemischbildung un Verbrennung", Dresden: Faculty of Transport and Traffic Sciences, Technische Universitat Dresden, Dec. 12, 2005, 190 pages. (Submitted in Three Parts) (See NPL Document 2, Office Action Issued in Application No. 102015007213.7 for Explanation of Relevance).
(Continued)

*Primary Examiner* — Jacob Amick
*Assistant Examiner* — Michael A Kessler
(74) *Attorney, Agent, or Firm* — Alleman Hall Creasman & Tuttle LLP

(57) ABSTRACT

A diesel engine includes a piston, a cylinder head, and a fuel injector. The fuel injector has a valve body with bored nozzle holes in its tip part. A cavity having a circular shape in plan view is formed in a crown surface of the piston to concave to the counter cylinder head side. A wall surface constituting the cavity has a central ridge portion bulging toward the fuel injector while bulging larger toward the center of the cavity, a periphery concave portion formed radially outward of the central ridge portion to concave radially outward, and a lip portion formed between the periphery concave portion and the crown surface to convex radially inward. A lip radius R, a nozzle hole length L, a nozzle hole diameter D, and a bore radius B are designed to satisfy the following equation:

$99.4D \times (1-3D) \times (L+2.7) \leq R \leq \min\{237.1D \times (1-3D) \times (0.8L+1), 2B/3\}$.

4 Claims, 13 Drawing Sheets

(51) Int. Cl.
*F02B 23/06* (2006.01)
*F02F 3/26* (2006.01)

(52) U.S. Cl.
CPC ........ *F02M 61/04* (2013.01); *F02M 61/1846* (2013.01); *F02B 23/0672* (2013.01); *F02F 3/26* (2013.01); *Y02T 10/125* (2013.01)

(58) Field of Classification Search
USPC ................................................ 123/276, 284
See application file for complete search history.

(56) References Cited

U.S. PATENT DOCUMENTS

| | | | | |
|---|---|---|---|---|
| 7,201,135 B2* | 4/2007 | Vachon | ..................... | F02B 3/06 123/294 |
| 8,544,770 B2* | 10/2013 | Limmer | ............. | F02M 61/1806 123/525 |
| 2010/0122686 A1* | 5/2010 | Kim | .................... | F02B 23/0651 123/298 |
| 2011/0215177 A1* | 9/2011 | Guerrassi | ............. | F02M 61/182 239/533.12 |
| 2012/0143479 A1* | 6/2012 | Nada | ................... | F02D 41/3029 701/104 |
| 2013/0036998 A1* | 2/2013 | Cornwell | ............ | F02B 23/0669 123/193.6 |

FOREIGN PATENT DOCUMENTS

| | | |
|---|---|---|
| DE | 102011119215 A1 | 5/2013 |
| JP | 2010121483 A | 6/2010 |

OTHER PUBLICATIONS

German Patent and Trade Mark Office, Office Action Issued in German Application No. 102015007213.7, Sep. 7, 2016, Munich, 19 pages. (Submitted with English Translation of Office Action).

* cited by examiner

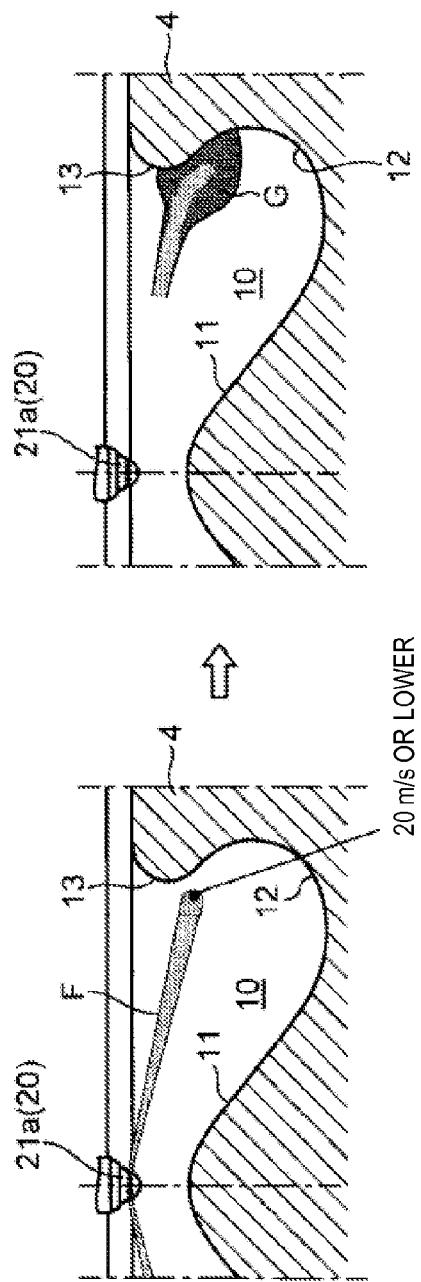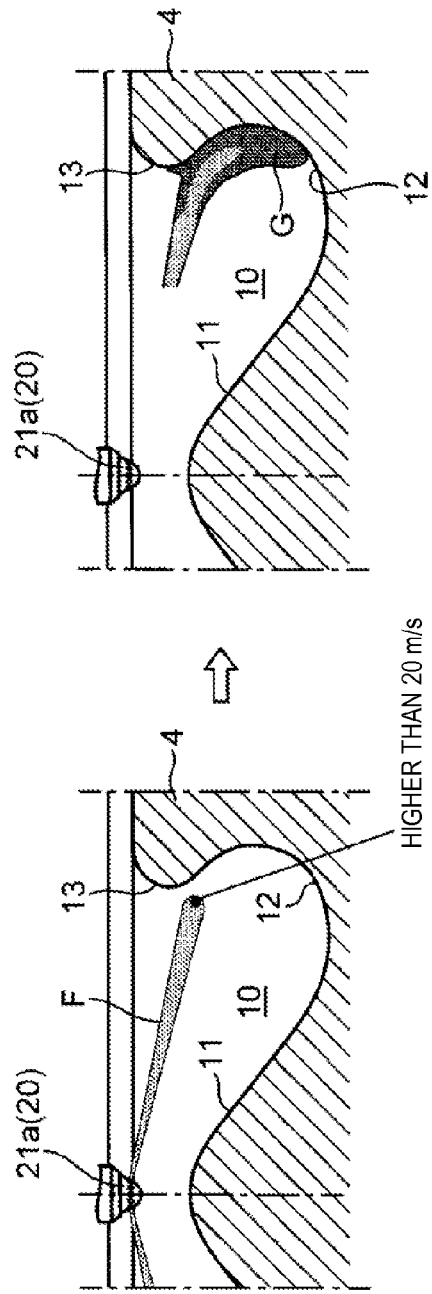

DIESEL ENGINE

BACKGROUND

The present invention relates to a diesel engine, which includes a piston for reciprocating inside a cylinder, a cylinder head covering an end surface of the cylinder from a side opposing to a crown surface of the piston, and a fuel injector attached to the cylinder head, and the present invention particularly relates to a diesel engine, which includes a piston with a so-called reentrant cavity formed in its crown surface.

Many diesel engines, especially comparatively compact diesel engines used in vehicles, are formed with a reentrant cavity (i.e., a cavity bulging at its central portion and tapering upward at its opening portion) at a crown surface of a piston thereof. JP2010-121483A discloses such a diesel engine.

According to the diesel engine of JP2010-121483A in which the reentrant cavity is formed in the piston, when a comparatively large amount of fuel is injected from a fuel injector within a medium or high engine load range, spray of the fuel flows to a circumferential edge portion of the cavity, and a flow of the spray reversing along a wall surface of the cavity (changing its direction toward the center of the cavity) occurs. Thus, mixing of the fuel with air is stimulated. Therefore, a generation amount of soot can be expected to be reduced.

To increase such a stimulation effect of the mixing within the medium and high engine load ranges even more, it is effective to increase the penetration (penetration force) of the fuel injected from the fuel injector. With strong penetration of the spray, the speed of the spray remains high even at a far distance from the fuel injector. Therefore, the spray can be spread farther and wider within the combustion chamber. Note that one of the factors that influence the penetration of the spray is a length of a nozzle hole of the fuel injector in an axial direction thereof (nozzle hole length). If the nozzle hole length is long, even with the same injection amount of fuel, the penetration of the spray becomes stronger. Therefore, in the case of increasing the penetration as described above, a fuel injector with a long nozzle hole length may be used, for example.

However, if the penetration of the spray is increased for the stimulation of mixing within the medium and high engine load ranges without sufficient consideration, the cooling loss within a low engine load range is increased, which may negatively influence the fuel consumption of the engine. Specifically, within the low engine load range where the fuel injection amount is small, generally the flow of the spray reversing along the wall surface of the cavity toward the center barely occurs. Therefore, even when the fuel within the spray is combusted, the flame (combustion gas) remains around a circumferential edge portion of the cavity and part of the heat generated by the combustion is absorbed by the wall surface of the cavity. Here, if the penetration of the spray is excessively increased, the flame spreads widely across the wall surface of the cavity, and a larger amount of the combustion heat is taken by the wall surface of the cavity. As a result, the cooling loss may increase.

SUMMARY

The present invention is made in view of the above situations and aims to provide a diesel engine, which is capable of achieving a reduction in both of a cooling loss within a low engine load range and soot within medium and high engine load ranges.

According to an aspect of the present invention, a diesel engine is provided. The diesel engine includes a piston for reciprocating inside a cylinder, a cylinder head covering an end surface of the cylinder from a side opposing to a crown surface of the piston, and a fuel injector attached to the cylinder head. The fuel injector has a valve body into which fuel is introduced, and a plurality of nozzle holes are bored into a tip part of the valve body that is an end part of the valve body on a piston side, wherein the fuel is injected through the plurality of nozzle holes from inside the valve body toward the piston. A cavity having a partially circular shape in a plan view is formed in the crown surface of the piston to create a concavity at an opposite side from the cylinder head so as to be able to receive the fuel injected from the fuel injector at least when the piston is at a top dead center. A wall surface constituting the cavity has a central ridge portion bulging toward the fuel injector as well as bulging larger toward the center of the cavity, a periphery concave portion formed outward of the central ridge portion in a radial direction of the piston and formed to concave radially outward in a vertical cross-sectional view, and a lip portion formed between the periphery concave portion and the crown surface of the piston and formed to convex radially inward in the vertical cross-sectional view. A lip radius R (mm), a nozzle hole length L (mm), a nozzle hole diameter D (mm), and a bore radius B (mm) are designed to have a relationship described by Equation 1, the lip radius R (mm) being a distance taken in a direction perpendicular to a central axis of the tip part of the fuel injector from the central axis to a part of the lip portion protruding the furthest radially inward, the nozzle hole length L (mm) being a length of each of the nozzle holes in an axial direction of the nozzle hole, the nozzle hole diameter D (mm) being a diameter of the nozzle holes, the bore radius B (mm) being a radius of the cylinder, and Equation 1 being expressed as follows.

$$99.4D \times (1-3D) \times (L+2.7) \leq R \leq \min\{237.1D \times (1-3D) \times (0.8L+1), 2B/3\} \quad (1)$$

Note that in Equation 1, "min{237.1D×(1−3D)×(0.8L+1), 2B/3}" means the smaller value between results of "237.1D×(1−3D)×(0.8L+1)" and "2B/3."

According to this configuration, the lip radius R of the cavity is designed to a value defined by "99.4D×(1−3D)×(L+2.7)" using the nozzle hole length L and the nozzle hole diameter D, or higher. Therefore, when a small amount of fuel is injected from the fuel injector within a low engine load range, a speed of a tip portion of spray at the time it reaches the wall surface of the cavity can sufficiently be reduced. Thus, when the fuel within the spray reacts with air and is combusted, a contact area of the wall surface of the cavity with the flame (combustion gas) caused by the combustion can be small and a loss caused by the combustion heat being absorbed through the wall surface, in other words, a cooling loss, can effectively be reduced.

Moreover, the lip radius R of the cavity is designed to a value defined by "min{237.1D×(1−3D)×(0.8L+1), 2B/3}" using the nozzle hole length L, the nozzle hole diameter D, and the bore radius B, or lower. Therefore, when a large amount of fuel is injected from the fuel injector within a medium or high engine load range, the speed of the tip portion of the spray at the time it reaches the wall surface of the cavity can be kept sufficiently high, and a flow of the reversed spray along the wall surface of the cavity (tumble flow) can be increased. Thus, the spray flows toward the center of the cavity while keeping the high speed, and the mixing of fuel is stimulated during this process. Therefore, the fuel can be combusted in an environment with plenty of air, and a generation amount of soot can effectively be reduced.

The nozzle hole diameter D is preferably designed to be 0.1±0.015 mm, and the nozzle hole length L is preferably designed to be 0.7 mm or shorter.

Such conditions of the nozzle hole diameter D and the nozzle hole length L are suitable for a compact diesel engine having a comparatively small exhaust amount (i.e., small bore radius).

Furthermore, in view of machinability when machining the nozzle holes in the fuel injector, or in view of the strength of the valve body, the nozzle hole length L is preferably designed to be 0.5 mm or longer.

BRIEF DESCRIPTION OF THE DRAWINGS

FIGS. 4A and 4B are views illustrating a structure of a fuel injector, in which FIG. 4A is a cross-sectional view and FIG. 4B is a side view.

FIGS. 8A and 8B show schematic views for describing a behavior of spray and combustion gas which is obtained in a case where the fuel is injected within a low engine load range, in which FIG. 8A is a case where a spray tip speed at a time it reaches a wall surface is set to 20 m/s or lower and FIG. 8B is a case where the spray tip speed at the same timing is set to be higher than 20 m/s.

FIGS. 9A and 9B show schematic views for describing a behavior of the spray and the combustion gas which is obtained in a case where the fuel is injected within a medium engine load range, in which FIG. 9A is a case where the spray tip speed at the time it reaches the wall surface is set to 50 m/s or higher and FIG. 9B is a case where the spray tip speed at the same timing is set to be lower than 50 m/s.

FIGS. 10A and 10B show charts used for specifying, in relation to a nozzle hole length, a condition of a lip radius designed to set the spray tip speed at the time it reaches the wall surface within the low engine load range to 20 m/s or lower, in which FIG. 10A shows a relationship between the spray tip reaching distance and the spray tip speed and FIG. 10B shows a relationship between a nozzle hole length and the lip radius.

FIGS. 11A and 11B show charts used for specifying, in relation to the nozzle hole length, a condition of the lip radius designed to set the spray tip speed at the time it reaches the wall surface within the medium engine load range to 50 m/s or higher, in which FIG. 11A shows a relationship between the spray tip reaching distance and the spray tip speed and FIG. 11B shows a relationship between the nozzle hole length and the lip radius.

DETAILED DESCRIPTION OF EMBODIMENT (I) Overall Configuration of Engine

Figure 1:
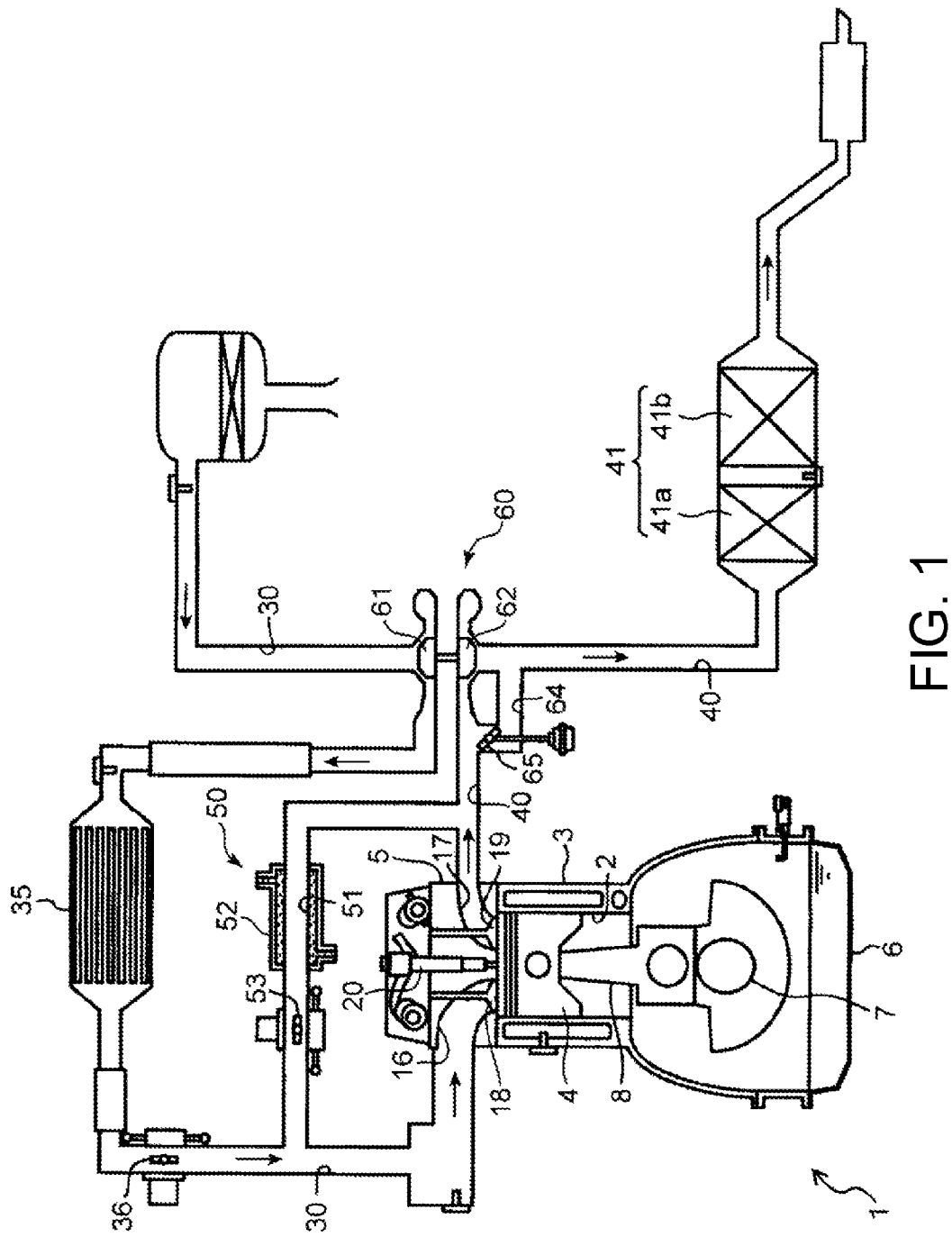
FIG. 1 is a view illustrating an overall configuration of a diesel engine according to one embodiment of the present invention.

FIG. 1 is a view illustrating an overall configuration of a diesel engine according to one embodiment of the present invention. The diesel engine in FIG. 1 is a four-cycle diesel engine to be mounted in a vehicle so as to be a drive force source for traveling. Specifically, the diesel engine includes an engine body 1 that is driven by receiving fuel mainly containing diesel fuel, an intake passage 30 for introducing air for combustion into the engine body 1, an exhaust passage 40 for discharging exhaust gas (combustion gas) generated by the engine body 1, an EGR device 50 for circulating, back to the intake passage 30, part of the exhaust gas passing through the exhaust passage 40, and a turbocharger 60 that is driven by the exhaust gas passing through the exhaust passage 40.

Figure 2:
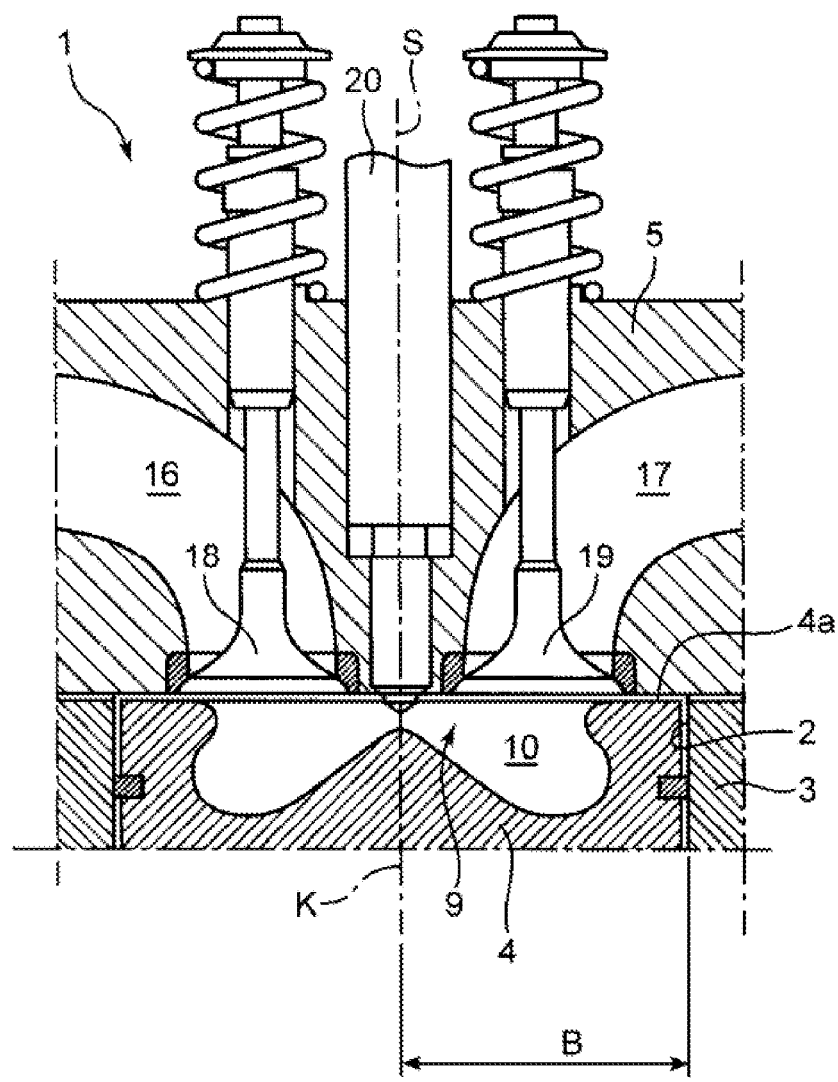
FIG. 2 is an enlarged cross-sectional view illustrating a part of an engine body.

FIG. 2 is a cross-sectional view illustrating a part of the engine body 1 in an enlarged manner. As illustrated in FIG. 2 and also FIG. 1 which was previously described, the engine body 1 includes a cylinder block 3 formed therein with one or more cylinders 2 extending in up-and-down directions of the engine body 1, a piston 4 accommodated inside each of the one or more cylinders 2 to be able to reciprocate (movable in the up-and-down directions), a cylinder head 5 provided to cover an end surface (top surface) of the cylinder 2 from a side opposing to a crown surface 4a of the piston 4, and an oil pan 6 disposed below the cylinder block 3 to store a lubricant therein.

The piston 4 is coupled to a crankshaft 7 via a connecting rod 8. The crankshaft 7 is an output shaft of the engine body 1. Moreover, a combustion chamber 9 is formed on the piston 4, and the fuel injected by a fuel injector 20 (described later) is mixed with air and causes diffusion combustion inside the combustion chamber 9. Further, by expansion energy caused by the combustion, the piston 4 reciprocates while the crankshaft 7 rotates around its central axis.

Here, a geometric compression ratio of the engine body 1, in other words, a ratio between a combustion chamber volume when the piston 4 is at a bottom dead center (BDC) and a combustion chamber volume when the piston 4 is at a top dead center (TDC) is set to be between 12:1 and 15:1 (e.g., 14:1). The range of 12:1 to 15:1 is considerably low for a geometric compression ratio of a diesel engine. Such a range is adopted so as to improve emission performance and thermal efficiency by reducing a combustion temperature.

The cylinder head 5 is formed with an intake port 16 for introducing air supplied from the intake passage 30 into the combustion chamber 9, an exhaust port 17 for discharging the exhaust gas generated inside the combustion chamber 9 to the exhaust passage 40, an intake valve 18 for opening and closing the intake port 16 on the combustion chamber 9 side, and an exhaust valve 19 for opening and closing the exhaust port 17 on the combustion chamber 9 side.

A cavity 10 is formed in the crown surface 4a of the piston 4 by concaving a section, including a central part of the crown surface 4a, to the opposite side from the cylinder head 5 (downward). The cavity 10 is formed to have a volume that becomes a major part of the combustion chamber 9 when the piston 4 is at the TDC.

The fuel injector 20 for injecting the fuel into the combustion chamber 9 is attached to the cylinder head 5. The fuel injector 20 is attached such that its end part on the piston 4 side (tip part 21a described later) is oriented toward a central portion of the cavity 10.

The EGR device 50 has an EGR passage 51 coupling the exhaust passage 40 to the intake passage 30, and an EGR cooler 52 and an EGR valve 53 disposed to the EGR passage 51. The EGR valve 53 is opened or closed to adjust a flow rate of the exhaust gas circulated from the exhaust passage 40 back to the intake passage 30 through the EGR passage 51, in other words, the EGR gas. The EGR cooler 52 is a heat exchanger for cooling the EGR gas. The EGR valve 53 is opened wide and introduces a sufficient amount of EGR gas into the engine body 1, for example, under a condition that an engine load is comparatively low. Thus, the combustion temperature is reduced and the emission performance is improved.

The turbocharger 60 has a compressor 61 disposed in the intake passage 30, a turbine 62 coaxially coupled to the compressor 61 and disposed inside the exhaust passage 40, a bypass passage 64 formed inside the exhaust passage 40 so as to bypass the turbine 62, and a wastegate valve 65 for opening and closing the bypass passage 64. The turbine 62 rotates by receiving the energy of the exhaust gas flowing inside the exhaust passage 40. The compressor 61 compresses (induces) the air flowing inside the intake passage 30 by rotating in cooperation with the turbine 62. The wastegate valve 65 is opened when a turbocharging pressure by the turbocharger 60 exceeds an upper limit value so as to prevent excessive increase of the turbocharging pressure.

Inside the intake passage 30, an intercooler 35 for cooling the air compressed by the compressor 61, and a throttle valve 36 are disposed downstream (downstream in a flow direction of intake air) of the compressor 61. Note that the throttle valve 36 is basically kept fully open or at a largely open state close to the fully open state while the engine is in operation, and is only closed as needed (e.g., when the engine is stopped) to close the intake passage 30.

Inside the exhaust passage 40, an exhaust emission control device 41 for purifying hazardous components within the exhaust gas is disposed downstream (downstream in a flow direction of the exhaust gas) of the turbine 62. The exhaust emission control device 41 includes an oxidation catalyst 41a for oxidizing CO and HC within the exhaust gas and a DPF 41b for capturing soot within the exhaust gas.

(II) Control System

Figure 3:
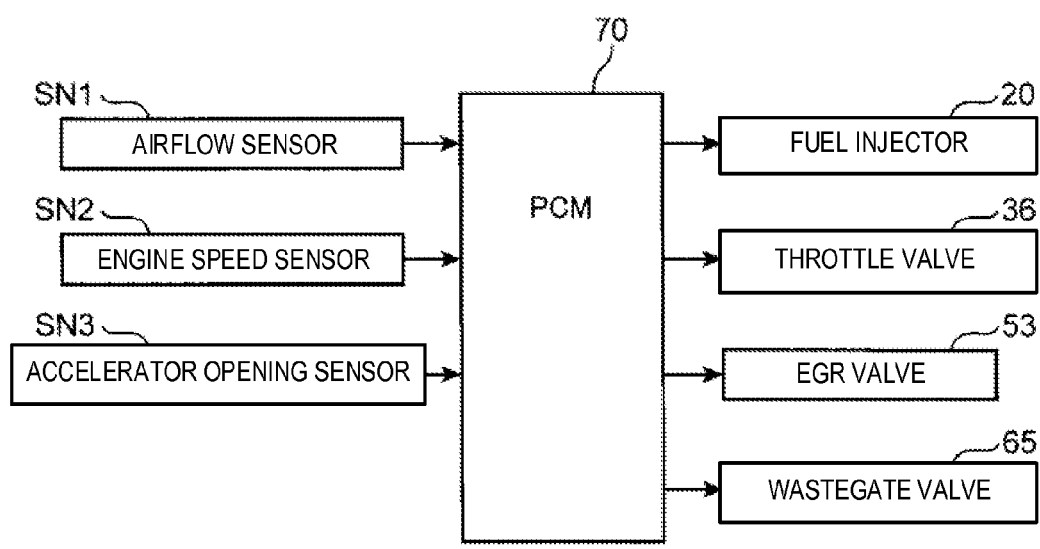
FIG. 3 is a block diagram illustrating a control system of the engine.

FIG. 3 is a block diagram illustrating a control system of the engine. As illustrated in FIG. 3, the diesel engine of this embodiment is entirely controlled by a PCM (power control module) 70. As is well known, the PCM 70 is a microprocessor comprised of a CPU (central processing unit), a ROM (read-only memory), and a RAM (random-access memory).

The PCM 70 is electrically connected with various sensors for detecting an operation state of the engine. Specifically, in parts of the engine and the vehicle, various sensors are provided which include an airflow sensor SN1 for detecting a flow rate of air sucked through the intake passage 30 (intake air amount), an engine speed sensor SN2 for detecting a rotational speed of the crankshaft 7 (engine speed), an accelerator opening sensor SN3 for detecting an opening of an acceleration pedal (not illustrated) controlled by a driver who operates the vehicle. Information detected by the various sensors is inputted into the PCM 70 in the form of as electric signals.

Moreover, the PCM 70 controls the respective parts of the engine while executing various determinations and operations based on the electric signals from the various sensors. In other words, the PCM 70 is electrically connected to the respective parts, such as the fuel injector 20, the throttle valve 36, the EGR valve 53, and the wastegate valve 65, and outputs drive control signals to these components based on the results of the operations and the like.

(III) Fuel Injector

Figure 4A:
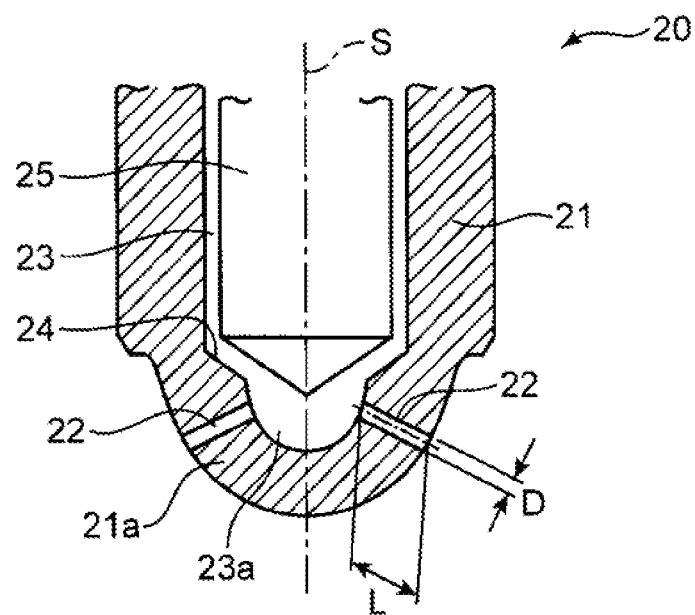
Figure 4B:
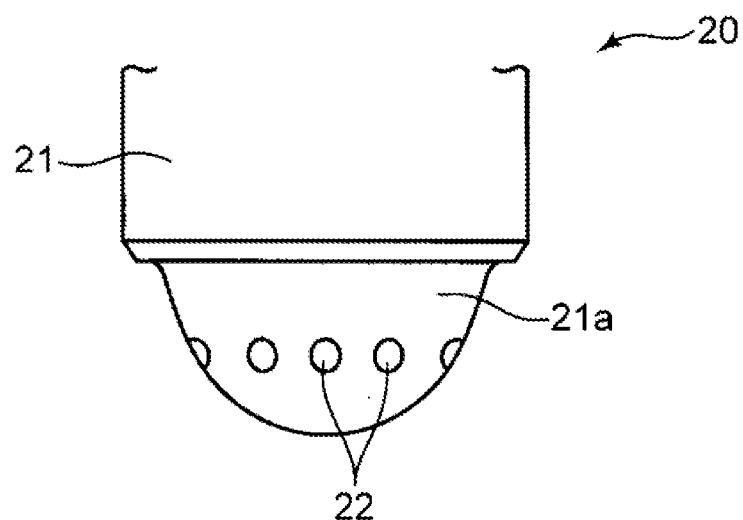

FIGS. 4A and 4B show a cross-sectional view and a side view illustrating a structure of the fuel injector 20, respectively. As illustrated in FIGS. 4A and 4B, the fuel injector 20 has a cylindrical valve body 21 formed therein with a fuel flow path 23 into which the fuel is introduced from a pressure accumulation chamber (out of range of the illustration), such as a common rail, and a needle valve 25 disposed to be able to project from and retreat into the fuel flow path 23 of the valve body 21. The valve body 21 has a tip part 21a having a hemispherical shape, and a downstream end section of the fuel flow path 23 corresponding to the tip part 21a is provided as an auxiliary chamber 23a having a hemispherical shape. Further, a seat part 24 on which a tip part of the needle valve 25 is seated when the needle valve 25 projects is formed in an inner surface of the valve body 21 around the auxiliary chamber 23a.

A plurality of nozzle holes 22 are formed in the tip part 21a of the valve body 21. Each nozzle hole 22 is formed to penetrate the tip part 21a, and communicates an outer surface of the tip part 21a of the valve body 21 in a radial direction of the tip part 21a to the auxiliary chamber 23a. Note that in this embodiment, a total of ten nozzle holes 22 are formed in the tip part 21a such that the nozzle holes 22 align in a circumferential direction of the tip part 21a at substantially even intervals. By passing through such nozzle holes 22, the fuel is injected radially in a plan view (see FIG. 7 described later).

A solenoid (not illustrated), the energization of which is controlled by the PCM 70 described above, is provided to the valve body 21, and the needle valve 25 is driven to project or retreat by a suction force of the solenoid. When the needle valve 25 is driven to project and is seated on the seat part 24, the introduction of the fuel into the auxiliary chamber 23a is interrupted and the fuel injection from each nozzle hole 22 is stopped. On the other hand, in the state where the needle valve 25 is seated on the seat part 24, when the projected needle valve 25 is driven to retreat (FIG. 4A illustrates such a state), the fuel is introduced into the auxiliary chamber 23a and the fuel injection from each nozzle hole 22 is started. The PCM 70 adjusts the injection amount of the fuel by controlling a timing of driving the needle valve 25 to retreat.

The fuel injector 20 having the above configuration is attached coaxially with the cylinder 2. In other words, when a straight line extending in the up-and-down directions through the center of the tip part 21a of the valve body 21 is a central axis S of the fuel injector 20, the fuel injector 20 is attached in a posture that the central axis S matches with a cylinder axial line K (the central axis of the cylinder 2) illustrated in FIG. 2.

Figure 5:
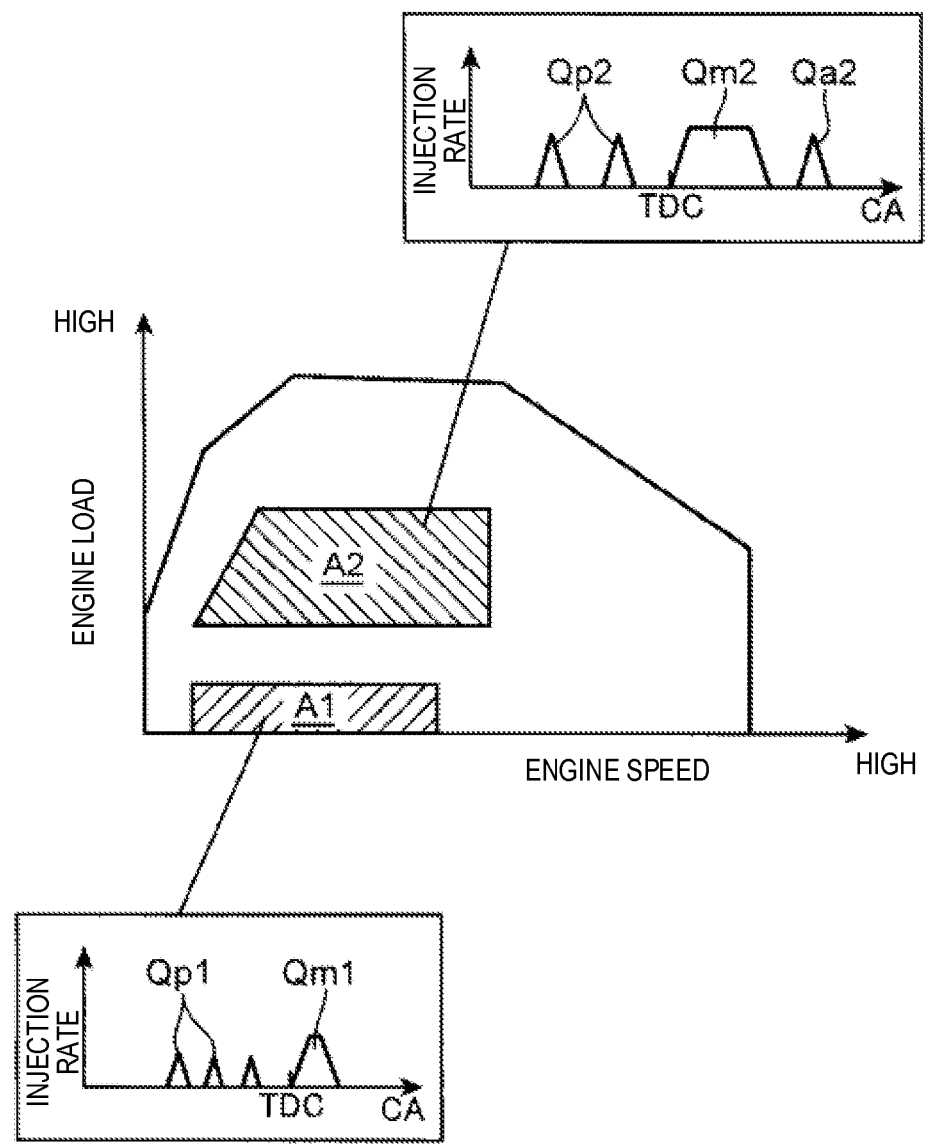
FIG. 5 is a chart illustrating an example of a fuel injection mode designed to differ according to an operation state of the engine.

FIG. 5 is a chart illustrating an example of a fuel injection mode designed to differ according to the operation state of the engine. As illustrated in FIG. 5, in the diesel engine of this embodiment, for example, within an operating range A1 where the engine load is extremely low, the fuel is split into three pre-injections Qp1 and a single main injection Qm1 and injected from the fuel injector 20. In the main injection Qm1, the fuel injection is started near a compression TDC (the TDC when compression stroke ends), and the injection amount for this fuel injection is set to 1 to 5 mm$^3$. In each pre-injection Qp1, a smaller amount of fuel than the main injection Qm1 is injected before the compression TDC (CTDC).

On the other hand, within a medium load operating range A2 where the engine load is higher than the operating range A1 and which is often applied for acceleration, the fuel is split into two pre-injections Qp2, a single main injection Qm2 and a single after injection Qa2 and injected from the fuel injector 20. In the main injection Qm2, the fuel injection is started near the CTDC, and the injection amount is set to about 10 to 30 mm$^3$. In each pre-injection Qp2, a smaller amount of the fuel than the main injection Qm2 is injected before the CTDC. In the after injection Qa2, a smaller amount of the fuel than the main injection Qm2 is injected after the main injection Qm2 is completed (during expansion stroke).

Note that although various patterns may be adopted as a fuel injection mode (the number of injections, an injection timing, and an injection amount) for a non-illustrated operating range other than the ranges A1 and A2, on the whole, the injection amount of the main injection (the fuel injection that is started near the CTDC) tends to be increased as the engine load becomes higher. Therefore, for example, at higher engine loads than the operating range A2, the injection amount of the main injection is increased to be larger than that within the operating range A2 (10 to 30 mm$^3$).

The fuel injection modes within the respective operating ranges as described above are achieved by the control performed by the PCM 70. In other words, the PCM 70 determines the operation state of the engine sequentially based on the signals from the airflow sensor SN1, the engine speed sensor SN2, and the accelerator opening sensor SN3, and the PCM 70 controls the fuel injector 20 to match with a corresponding target injection mode. Note that a target injection mode is designed for each of the operation states.

(IV) Shape of Cavity

Figure 6:
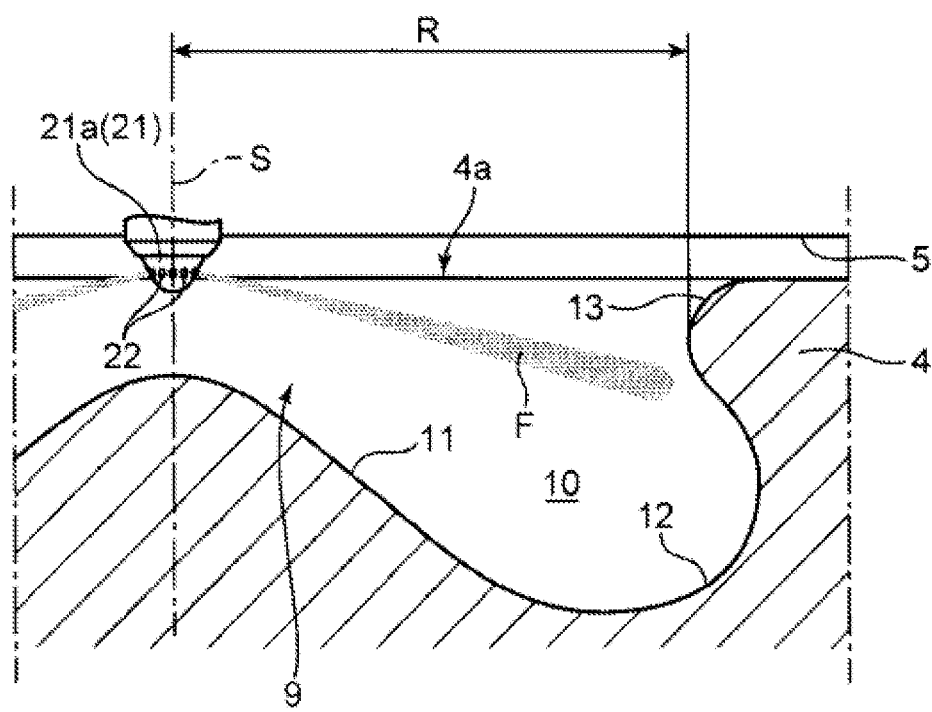
FIG. 6 is an enlarged cross-sectional view of a part of a piston.
Figure 7:
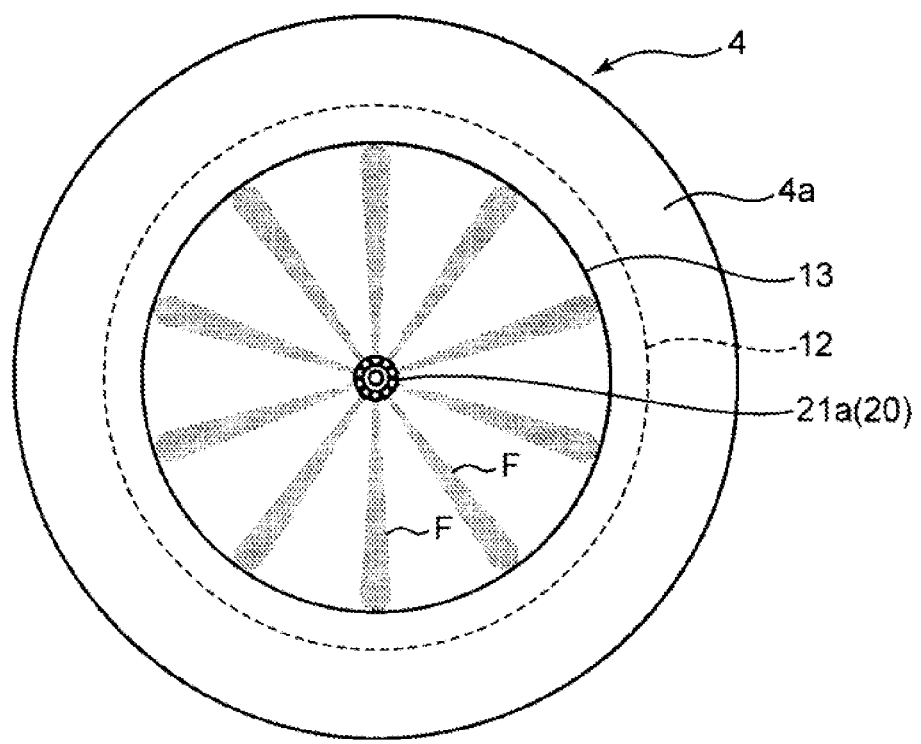
FIG. 7 is a plan view of the piston.

FIGS. 6 and 7 show an enlarged cross-sectional view and a plan view of the piston 4, respectively illustrating a specific shape of the cavity 10. Note that the piston 4 at the TDC is illustrated in FIG. 6 and spray of the fuel injected from the nozzle holes 22 of the fuel injector 20 is illustrated with a reference mark F in FIGS. 6 and 7. As can be understood from FIGS. 6 and 7, the cavity 10 is designed to have a shape and size in which the fuel (spray F) injected from the fuel injector 20 at least when the piston 4 is at the TDC can be received.

As illustrated in FIGS. 6 and 7, the cavity 10 is a so-called reentrant cavity. In other words, a wall surface constituting the cavity 10 has a central ridge portion 11 bulging upward, a periphery concave portion 12 formed outward of the central ridge portion 11 in a radial direction of the piston 4 and having a circular shape in the plan view, and a lip portion 13 formed between the periphery concave portion 12 and the crown surface 4a of the piston 4 and having a circular shape in the plan view.

The central ridge portion 11 bulges toward the fuel injector 20 as well as bulges larger toward the center of the cavity 10, and is formed such that its top position is directly below the tip part 21a of the fuel injector 20. The periphery concave portion 12 is formed continuously from the central ridge portion 11 and has an arc shape to concave outward in the radial direction of the piston 4 in a vertical cross-sectional view. The lip portion 13 is formed continuously from the periphery concave portion 12 and has an arc shape to convex inward in the radial direction of the piston 4 in the vertical cross-sectional view.

The cavity 10 having the above configuration, as a whole, has a cross-sectional shape tapering upward so that the opening area becomes smaller toward the crown surface 4a of the piston 4. When a comparatively large amount of fuel is injected particularly within the operating range where the engine load is medium or higher, such a reentrant cavity 10 exerts a function of reversing the flow of the spray F of the fuel inwardly (toward the center of the cavity 10) from the radially outward side mainly along the periphery concave portion 12 and the central ridge portion 11 (e.g., see FIG. 9 described later), which is advantageous in stimulating the mixing of the fuel.

(V) Dimensional Conditions

As illustrated in FIG. 6, a distance taken horizontally (in parallel to the crown surface 4a of the piston 4) from the central axis S of the fuel injector 20 to a part of the lip portion 13 protruding furthest inward in the radial direction is a lip radius R (mm). Moreover, as illustrated in FIG. 4A, a length of each nozzle hole 22 of the fuel injector 20 in the axial direction is a nozzle hole length L (mm), and a diameter of the nozzle holes 22 is a nozzle hole diameter D (mm). Further, as illustrated in FIG. 2, the radius of the cylinder 2 is a bore radius B (mm). In the diesel engine of this embodiment, the lip radius R, the nozzle hole length L, the nozzle hole diameter D, and the bore radius B are designed to satisfy a relationship of the following Equation 1.

$$99.4D \times (1-3D) \times (L+2.7) \leq R \leq \min\{237.1D \times (1-3D) \times (0.8L+1), 2B/3\} \quad (1)$$

Note that in Equation 1, "min{237.1D×(1−3D)×(0.8L+1), 2B/3}" means the smaller value between results of "237.1D×(1−3D)×(0.8L+1)" and "2B/3."

According to the study performed by the present inventors, it was found that by designing the diesel engine to satisfy the relationship of Equation 1, reduction in both of a cooling loss within the low engine load range and soot within the medium and high engine load ranges can be achieved, which is described in detail as follows.

The present inventors conducted an experiment in which by using the main injections (Qm1 and Qm2) that are performed within the operating ranges A1 and A2 illustrated in FIG. 5, the fuel was injected from the fuel injector 20 by various amounts when the piston 4 was at the CTDC, and the behaviors of the spray of the fuel in the injections were examined. As a result, the following result was obtained.

Within the low engine load range such as the operating range A1, since the injection amount of fuel from the fuel injector 20 is small, the speed of the spray F of the fuel discharged from the nozzle holes 22 in the injection significantly decelerates by the time that the spray F reaches the wall surface of the cavity 10 (lip portion 13). Therefore, the flow of the spray F reversing radially inward along the wall surface of the cavity 10 hardly occurs, and the tip portion of the spray F reacts with air and is combusted without large movement from the periphery of the wall surface of the cavity 10. Here, if a contact area of the wall surface of the cavity 10 with the flame (combustion gas) is large, a loss caused by the combustion heat being absorbed through the wall surface, in other words, the cooling loss, increases. Thus, it can be understood that within the low engine load range, reducing the area of the wall surface of the cavity 10 with which the flame contacts as much as possible is important in reducing the cooling loss.

As a result of performing various studies and experiments from the above points of view, the present inventors obtained knowledge, as illustrated in FIG. 8A, that if the speed of the tip portion of the spray F at the time it reaches the wall surface of the cavity 10 is 20 m/s or lower, the area of the wall surface with which the flame (combustion gas) G caused by combustion that occurs after the spray F reaches the wall surface contacts becomes comparatively small, and the cooling loss is sufficiently reduced. On the other hand, as illustrated in FIG. 8B, if the speed of the tip portion of the spray F at the time it reaches the wall surface of the cavity 10 exceeds 20 m/s, the contact area of the wall surface with the flame G becomes large, and the cooling loss increases.

Figure 10A:
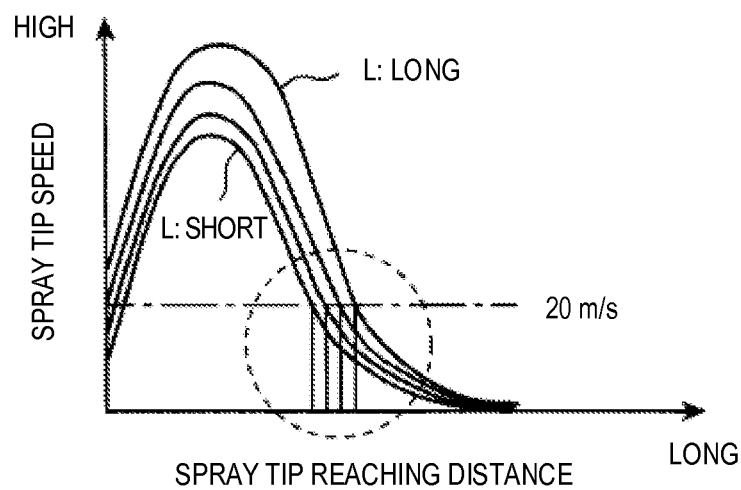

Further, the present inventors, upon designing a fuel injection pressure (fuel pressure) to be 120 MPa and the fuel injection amount to be 3 mm³, conducted an experiment in which the fuel is injected in various situations with different conditions of the nozzle hole length L of the fuel injector 20, performed value calculations in the experiment, and checked the speed of the spray F in such situations. The result is illustrated in the chart of FIG. 10A. Note that in the chart of FIG. 10A, "SPRAY TIP REACHING DISTANCE" corresponding to the lateral axis means a separation distance indicating a distance of the tip portion of the spray F from the central axis S of the fuel injector 20 in the radial direction, and "SPRAY TIP SPEED" corresponding to the vertical axis means speeds of the tip portion of the spray F when the tip portion reaches predetermined positions of the lateral axis.

According to FIG. 10A, regardless of the nozzle hole length L, as a waveform of the spray tip speed, similar waveforms having a peak at a position slightly far from the nozzle hole 22 can be obtained. In other words, regardless of the nozzle hole length L, the spray tip speed changes with similar tendencies in which it gradually becomes higher as the tip portion flows away from the nozzle hole 22, and then gradually becomes lower. Note that when comparing at the same spray tip reaching distance, the spray tip speed becomes higher as the nozzle hole length L becomes longer. This is because, with the same nozzle hole diameter D, penetration (penetration force) of the spray F becomes stronger as the nozzle hole length L becomes longer.

Moreover, in FIG. 10A, a line (constant velocity line) wherein the spray tip speed=20 m/s is indicated by a one-dotted chain line. Each intersection point of the constant velocity line with the respective waveforms indicates the separation distance of the position at which the tip portion of the spray F reaches when the speed of the tip portion is reduced to 20 m/s, from the central axis S. As is clear from the section defined by the dashed line in FIG. 10A, the separation distance at which the speed of the tip portion of the spray F becomes 20 m/s or lower becomes longer as the nozzle hole length L of the fuel injector 20 becomes longer, and it becomes shorter as the nozzle hole length L becomes shorter.

Figure 10B:
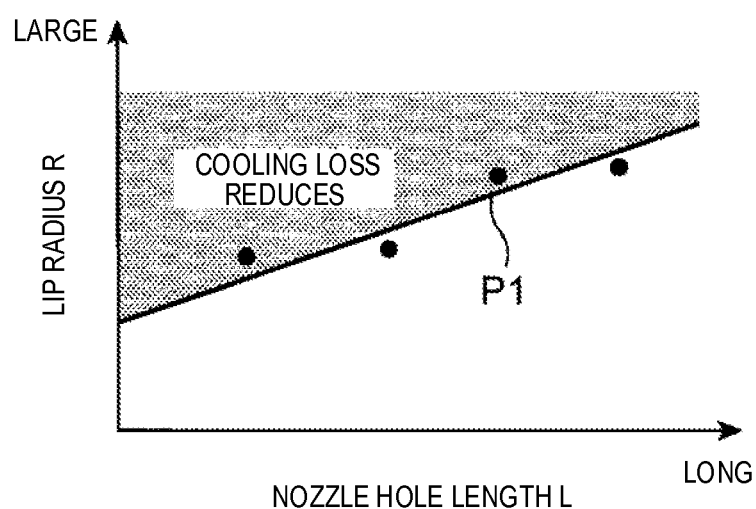

FIG. 10B is a chart illustrating a condition of the lip radius R of the cavity 10, derived from the tendency of the data obtained from FIG. 10A. The values on the lateral axis at a plurality of plots (black circles) illustrated in the chart correspond to the nozzle hole lengths L corresponding to the respective waveforms in FIG. 10A, respectively. The values on the vertical axis at the respective plots correspond to the spray tip reaching distances at the intersection points of the constant speed line of 20 m/s with the respective waveforms (correspond to the separation distances with which the speed of the tip portion of the spray F becomes 20 m/s or lower). As is clear from the disposition of the plurality of plots, the condition for achieving the spray tip speed of 20 m/s is distributed along a straight line P1 inclining upward to the right.

When a function (linear function) indicating the straight line P1 was found based on the data obtained under the condition that the nozzle hole diameter D is the same, 0.1 mm, it was found that the function can be expressed by "R=6.96×(L+2.7)." Further, when a function of the straight line P1 in a case where the nozzle hole diameter D is generalized was found based on some pieces of data and a theory obtained in a case where the nozzle hole diameter D is not 0.1 mm, the following Equation 2 was obtained.

$$R=99.4D\times(1-3D)\times(L+2.7) \qquad (2)$$

Designing the lip radius R to a value on the straight line P1 expressed by Equation 2 means that the speed of the tip portion of the spray F becomes 20 m/s at the time that the tip portion reaches the wall surface (lip portion 13) of the cavity 10. Therefore, if the lip radius R is designed to be higher than the straight line P1 (Equation 2), within the low engine load range, the speed of the spray F at the time it reaches the wall surface is reduced to 20 m/s or lower. In other words, by designing the lip radius R to be larger as the nozzle hole length L becomes longer so that the lip radius R becomes higher than the straight line P1 (Equation 2), the shape of the cavity 10 that is advantageous in reducing the cooling loss within the low engine load range can be created.

On the other hand, within the medium engine load range, such as the operating range A2, or an engine load range higher than the medium engine load range, since the injection amount of the fuel from the fuel injector 20 is large, the spray F of the fuel discharged from the nozzle holes 22 in the injection is kept at a considerably high speed even at the time it reaches the wall surface (lip portion 13) of the cavity 10. Therefore, the spray F reverses radially inward along the wall surface of the cavity 10 and flows toward the center of the cavity 10 while keeping the high speed, and the spray F reacts with air during this process and is combusted. Here, if the flow of the spray F toward the center of the cavity 10 is weak, the spray F is not sufficiently mixed with air, and therefore, an over-rich zone where the fuel becomes excessively rich is created and the generation amount of soot is increased. Thus, it can be understood that within the medium and high engine load ranges, in reducing the generation amount of soot, increasing the flow of the spray toward the center of the cavity 10 as much as possible is important.

Figure 9A:
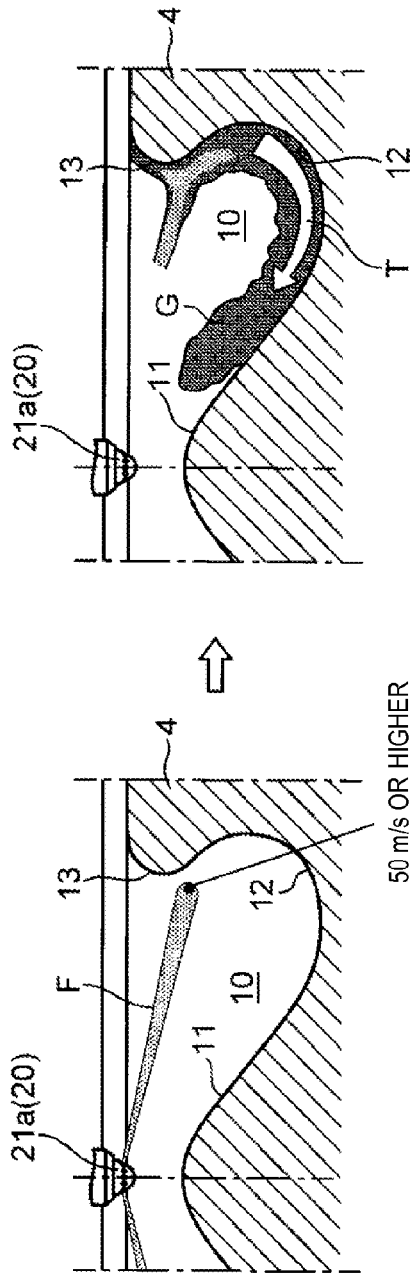
Figure 9B:
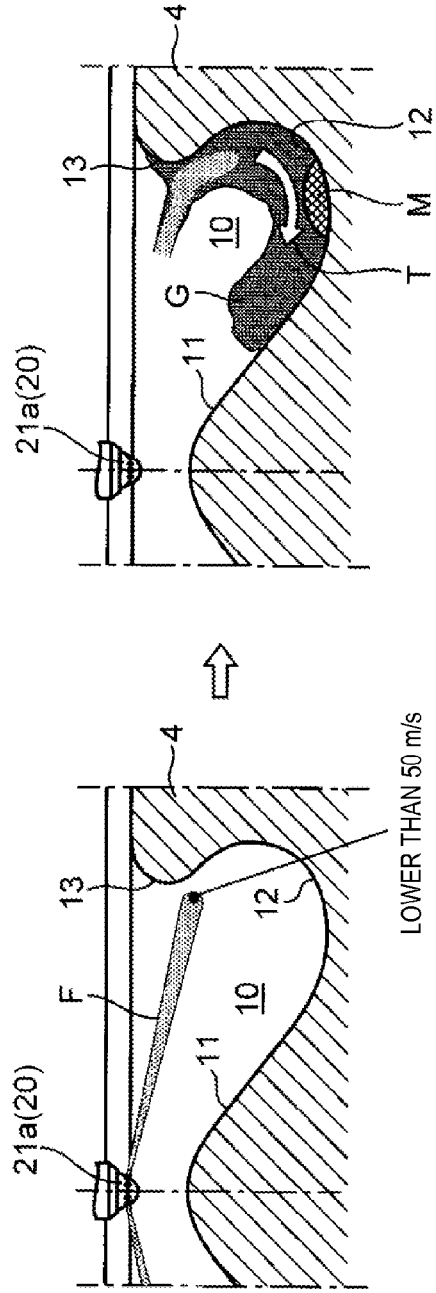

As a result of performing various studies and experiments from the above points of view, as illustrated in FIG. 9A, the present inventors obtained knowledge that if the speed of the tip portion of the spray F at the time it reaches the wall surface of the cavity 10 is 50 m/s or higher, the flow of the reversed spray F along the wall surface of the cavity 10 after reaching the wall surface of the cavity 10 (hereinafter, referred to as the tumble flow T) becomes sufficiently strong, the fuel is combusted while sufficiently mixing with air, and as a result, the generation amount of soot can sufficiently be reduced. On the other hand, as illustrated in FIG. 9B, if the speed of the tip portion of the spray F at the time it reaches the wall surface of the cavity 10 becomes lower than 50 m/s, the sufficiently strong tumble flow T is not formed, and therefore, an over-rich zone M of the fuel is formed in a part of the mixed fuel and air, and the generation amount of soot is increased.

Figure 11A:
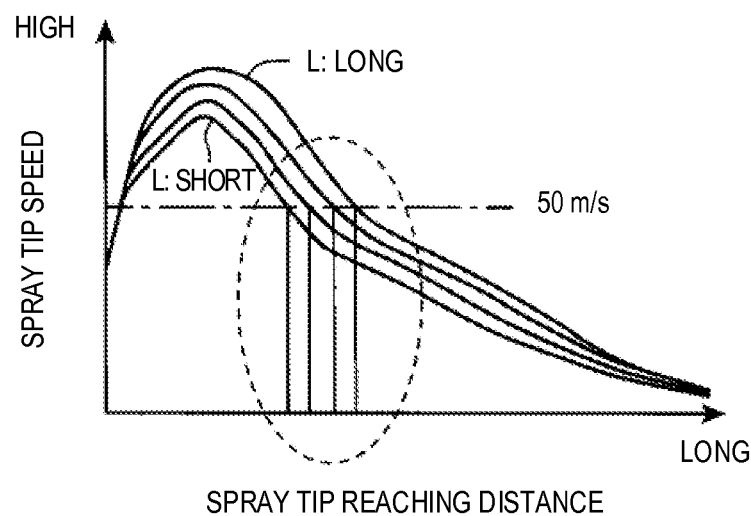

Further, the present inventors, upon designing a fuel injection pressure (fuel pressure) to be 120 MPa and the fuel injection amount to be 20 mm³, conducted an experiment in which the fuel is injected in various situations with different conditions of the nozzle hole length L of the fuel injector 20, performed value calculation in the experiment, and checked the speed of the spray F in such situations. The result is illustrated in the chart of FIG. 11A. According to this chart, the separation distance (spray tip reaching distance) at which the speed of the tip portion of the spray F decreases to 50 m/s becomes longer as the nozzle hole length L of the fuel injector 20 becomes longer and it becomes shorter as the nozzle hole length L becomes shorter.

Figure 11B:
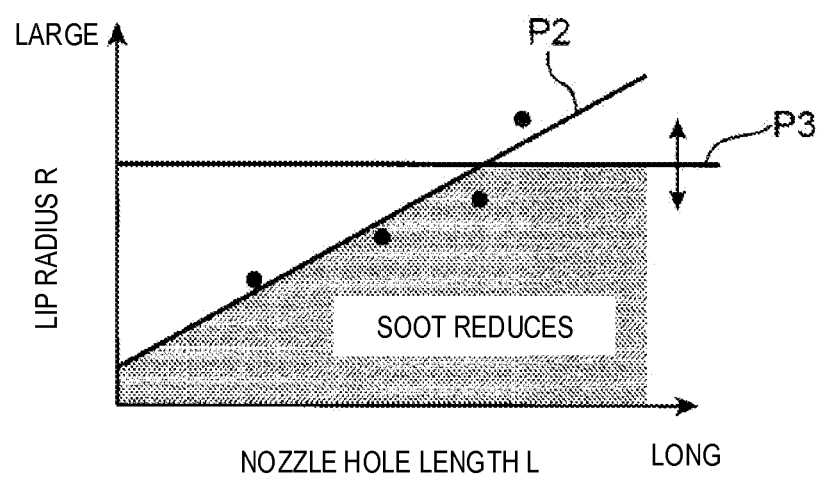

Moreover, the condition of the lip radius R of the cavity 10 was studied based on the data obtained from the chart of FIG. 11A, and the chart of FIG. 11B was obtained. According to this chart, the condition for achieving the spray tip speed of 50 m/s is distributed along a straight line P2 inclining upward to the right. When a function indicating the straight line P2 was found based on the data obtained under the condition that the nozzle hole diameter D is the same, 0.1 mm, it was found that the function can be expressed by "$R=16.6 \times (0.8L+1)$". Further, when a function of the straight line P2 in a case where the nozzle hole diameter D is generalized was found based on some pieces of data and a theory obtained in a case where the nozzle hole diameter D is not 0.1 mm, the following Equation 3 was obtained.

$$R = 237.1D \times (1-3D) \times (0.8L+1) \qquad (3)$$

Designing the lip radius R to a value on the straight line P2 expressed by Equation 3 means that the speed of the tip portion of the spray F becomes 50 m/s at the time that the tip portion reaches the wall surface (lip portion 13) of the cavity 10. Therefore, if the lip radius R is designed to be on the straight line P2 (Equation 3) or lower, within the engine load range higher than the medium load range, the speed of the spray F at the time it reaches the wall surface is kept at a high value, which is 50 m/s or higher. Thus, the sufficiently strong tumble flow T is formed within the cavity 10 and it can be expected that the mixing of the fuel is stimulated and the soot is reduced.

Here, according to FIG. 11B, an upper limit value of the lip radius R indicated by the straight line P2 (Equation 3) becomes higher in proportion to the nozzle hole length L. Therefore, if the nozzle hole length L is designed comparatively long, the lip radius R can also be enlarged accordingly. However, for example, when the lip radius R is enlarged without giving sufficient consideration to the bore radius B of the cylinder 2, a sufficient depth of the cavity 10 cannot be secured due to restriction of the volume of the combustion chamber 9 for securing the desirable geometric compression ratio. An insufficient depth of the cavity 10 leads to interrupting the growth of the tumble flow T that is formed within the cavity 10 (i.e., interrupting the mixing of the fuel) within the medium and high engine load ranges. Therefore, the lip radius R of the cavity 10 is desirably held within a range determined in relation to the bore radius B. As a result of the studies and experiments, the present inventors obtained knowledge that it is effective to suppress the lip radius R to be ⅔ or less of the bore radius B.

In FIG. 11B, values acquired in the case where the lip radius R is designed to be ⅔ of the bore radius B ($R=2B/3$) are illustrated as a straight line P3. In other words, to form the sufficiently strong tumble flow T within the cavity 10 and reduce soot, in consideration of the straight line P3 in addition to the straight line P2 described above, the lip radius R needs to be designed within a section below both of the lines P2 and P3. Note that if the bore radius B is changed, as illustrated in FIG. 11B, the position of the straight line P3 accordingly shifts in the vertical axis.

In consideration of the knowledge obtained as described above (respective conditions of FIGS. 10B and 11B), in this embodiment, the lip radius R of the cavity 10 is designed to the value that satisfies Equation 1 described above. In other words, by using the nozzle hole length L, the nozzle hole diameter D, and the bore radius B, the lip radius R is designed to be a value between "$99.4D \times (1-3D) \times (L+2.7)$" (mm) and "$\min\{237.1D \times (1-3D) \times (0.8L+1), 2B/3\}$" (mm).

Figure 12:
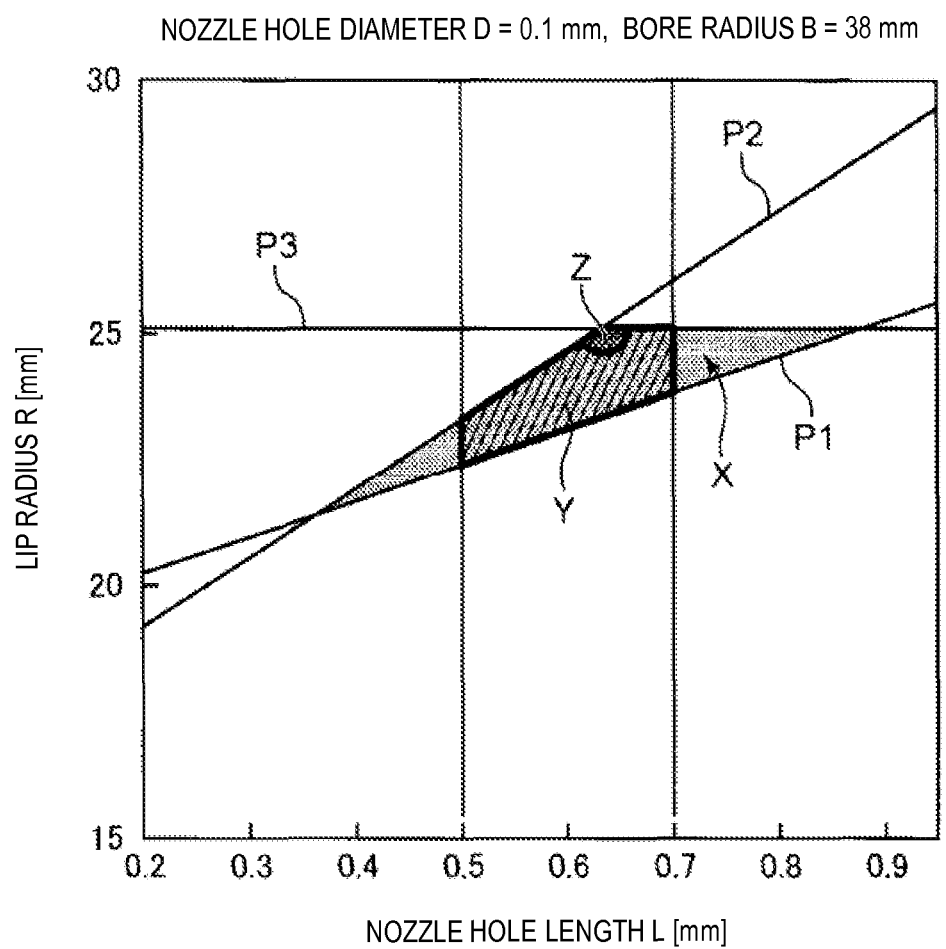
FIG. 12 is a chart illustrating a condition of the nozzle hole length and the lip radius with which reduction in both of a cooling loss and soot can be achieved in a case where a nozzle hole diameter is 0.1 mm and a bore radius is 38 mm.

FIG. 12 is a chart illustrating ranges of the nozzle hole length L and the lip radius R matching with the conditions of FIGS. 10B and 11B described above in an example that the nozzle hole diameter D of the fuel injector 20 is 0.1 mm and the bore radius B of the cylinder 2 is 38 mm. In the chart of FIG. 12, as in FIGS. 10B and 11B, the condition for the speed of the fuel spray F injected within the low engine load range to be 20 m/s or lower at the time it reaches the wall surface of the cavity 10 is indicated by the straight line P1, the condition for the speed of the fuel spray F injected within the medium or high engine load range to be 50 m/s or higher at the time it reaches the wall surface of the cavity 10 is indicated by the straight line P2, and the condition for suppressing the lip radius R to be ⅔ or less of the bore radius B (here, 25.3 mm or less) is indicated by the straight line P3. As is clear from the chart, all of the three requirements (the spray speed is 20 m/s or lower within the low engine load range and 50 m/s or higher within the medium and high engine load ranges, and the lip radius is restricted in relation to the bore radius) can be satisfied when the nozzle hole length L and the lip radius R are within a section X defined by the straight lines P1, P2 and P3 (i.e., a section X that is lower than the straight lines P2 and P3 but higher than the straight line P1).

In other words, in the example of FIG. 12 ($D=0.1$ and $B=38$), by designing the nozzle hole length L and the lip radius R to be within the section X, the reduction in both of the cooling loss within the low engine load range and soot within the medium and high engine load ranges can be achieved.

Further, in FIG. 12, a condition of the nozzle hole length L which is considered to be desirable in a comparatively compact diesel engine is added, which is indicated as a section Y. The section Y is the section X with the exclusion of the range of $L<0.5$ and the range of $L>0.7$, in other words, the section X with the nozzle hole length L limited to $0.5 \leq L \leq 0.7$.

The bore radius B of 38 mm which is a precondition of the example of FIG. 12 can be applied to comparatively compact diesel engines such as a four-cylinder engine of which a total emission is 1.5L (single-cylinder displacement 375 cc). Note that the bore radius B may be smaller than 38 mm if the displacement is smaller, and even with the same displacement, the bore radius B may still be smaller than 38 mm depending on a target characteristic of the engine. When the bore radius B becomes smaller than 38 mm, the upper limit value of the lip radius R determined in relation to the bore radius B (i.e., the position of the straight line P3) shifts lower in the chart, and the section X becomes narrower to the lower side. However, if the nozzle hole length L is 0.7 mm or shorter, even if the section X is slightly narrowed to the lower side due to, for example, the small displacement, it can be considered that the nozzle hole length L and the lip radius R can be designed within the respective ranges of the section X.

Although, having a shorter nozzle hole length L means that the thickness of the tip part 21a of the valve body 21 in which the nozzle holes 22 are formed becomes accordingly thinner. Therefore, if the nozzle hole length L is shortened without sufficient consideration, a disadvantage may occur in view of the machinability when machining the nozzle holes 22 or in view of the strength of the valve body 21. From such points of view, the nozzle hole length L is preferably designed to be 0.5 mm or longer.

As described above, when the nozzle hole diameter is 0.1 mm, in a case where applying the fuel injector 20 to a comparatively compact diesel engine is considered and also the machinability of the nozzle holes 22 or the like are considered, as indicated by the section Y of FIG. 12, the nozzle hole length L is preferably designed to be between 0.5 mm and 0.7 mm. Obviously, such a design is not limited to the case where the nozzle hole diameter D is 0.1 mm, and the same design can be applied if the nozzle hole diameter D is close to 0.1 mm. For example, if the nozzle hole diameter D is 0.1±0.015 mm, the same range between 0.5 mm and 0.7 mm can be adopted as the preferable range of the nozzle hole length L.

Here, since the soot generated inside the combustion chamber 9 is finally captured by the DPF 41b, it can be said to be sufficient if the soot reduction effect is achieved on a certain level. On the other hand, for the reduction effect of the cooling loss, it can be considered to be more preferable if it is higher, in view of the fuel consumption. Thus, in a case of focusing on the fuel consumption, the lip radius R and the like are preferably designed to be values corresponding to a point that is the far-most position from the straight line P1 (i.e., the closest position to the straight line P2) within the section X (or the section Y). Specifically, in the example of FIG. 12, the lip radius R and the nozzle hole length L are preferably designed to be values corresponding to a section Z (near the intersection point between the straight lines P2 and P3) where the lip radius R is particularly large within the section near the straight line P2.

Note that in this embodiment, the experiment in which the fuel is injected from the fuel injector 20 at the fuel pressure of 120 MPa, and the like are conducted, and thus, the condition of Equation 1 is obtained; however, since the factor that has a great influence on the penetration of the spray is the injection amount, even if the fuel pressure slightly varies, the result obtained will not greatly change. Therefore, the condition of Equation 1 is applicable to various kinds of diesel engines, without being limited to the diesel engine designed to cause the fuel pressure of 120 MPa. For example, with a diesel engine designed to cause the fuel pressure of about 50 to 250 MPa, the lip radius R and the like can be determined by using the same condition as Equation 1.

Figure 13:
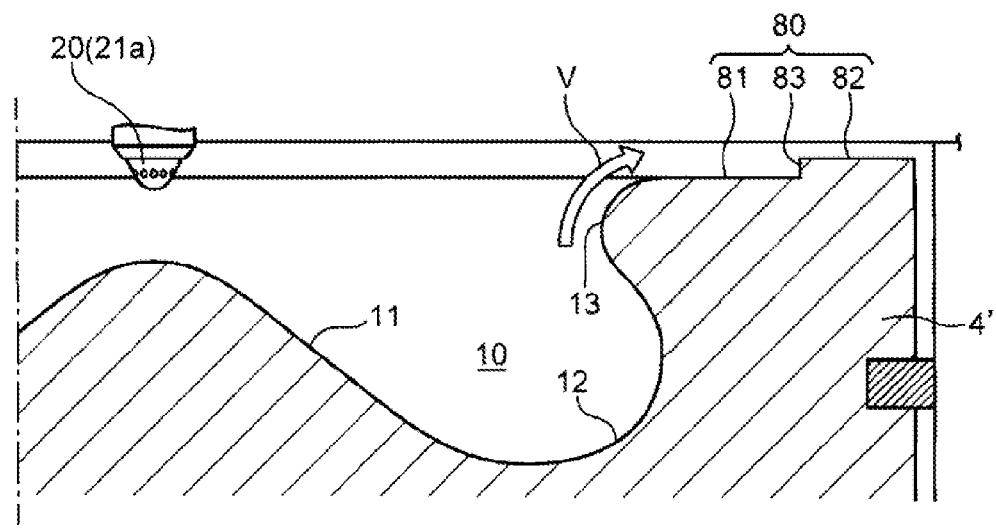
FIG. 13 is a view for describing a modification of the embodiment.

Moreover, in this embodiment, as illustrated in FIG. 2 and the like, the part of the crown surface 4a of the piston 4 on the radially outward side of the cavity 10 (hereinafter, this part of the crown surface is referred to as the squish part) is entirely formed with a plan surface; however, the squish part may have a step portion. For example, as a piston 4' illustrated in FIG. 13, it can be considered to provide a radially inward portion 81 of a squish part 80 to be lower than a radially outward portion 82, and a step portion 83 is provided therebetween. The present inventors found that by providing such a step portion 83, when the piston 4' at the CTDC descends, a formation of a reverse squish flow V leading to the squish part 80 from the cavity 10 along the lip portion 13 of the cavity 10 is suppressed. Particularly within the medium and high engine load ranges, such a suppression effect of the reverse squish flow V leads to stimulating the growth of the tumble flow T (see FIG. 9A) formed within the cavity 10. Therefore, by adopting the configuration of providing the step portion 83 as FIG. 13 in addition to satisfying the condition of Equation 1 described above, the mixing of the fuel can sufficiently be stimulated, and the soot generation can be more effectively reduced.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Engine Body
2 Cylinder
4 Piston
5 Cylinder Head
10 Cavity
11 Central Ridge Portion
12 Periphery Concave Portion
13 Lip Portion
20 Fuel Injector
21 Valve Body
21a Tip Part
22 Nozzle Hole

What is claimed is:
1. A diesel engine, comprising:
a piston for reciprocating inside a cylinder;
a cylinder head covering an end surface of the cylinder from a side opposing to a crown surface of the piston; and
a fuel injector attached to the cylinder head,
wherein the fuel injector has a valve body into which fuel is introduced, and a plurality of nozzle holes are bored into a tip part of the valve body that is an end part of the valve body on a piston side, wherein the fuel is injected through the plurality of nozzle holes from an inside of the valve body toward the piston,
wherein a cavity having a circular shape in a plan view is formed in the crown surface of the piston to concave at an opposite side from the cylinder head so as to be able to receive the fuel injected from the fuel injector at least when the piston is at a top dead center,
wherein a wall surface constituting the cavity has a central ridge portion bulging toward the fuel injector as well as bulging larger toward the center of the cavity, a periphery concave portion formed outward of the central ridge portion in a radial direction of the piston and formed to concave radially outward in a vertical cross-sectional view, and a lip portion formed between the periphery concave portion and the crown surface of the piston and formed to convex radially inward in the vertical cross-sectional view,
wherein a lip radius R (mm), a nozzle hole length L (mm), a nozzle hole diameter D (mm), and a bore radius B (mm) are designed to have a relationship described by Equation 1, the lip radius R (mm) being a distance taken in a direction perpendicular to a central axis of the tip part of the fuel injector from the central axis to a part of the lip portion protruding the furthest radially inward, the nozzle hole length L (mm) being a length of each of the nozzle holes in an axial direction of the nozzle hole from an inner surface of the valve body to an outer surface of the valve body, and the nozzle hole length L being in a range from 0.5 mm to 0.7 mm, the nozzle hole diameter D (mm) being a diameter of the nozzle holes, the bore radius B (mm) being a radius of the cylinder, and Equation 1 being expressed as follows:

$$99.4D \times (1-3D) \times (L+2.7) \leq R \leq \min\{237.1D \times (1-3D) \times (0.8L+1), 2B/3\} \quad (1)$$

wherein the fuel injector being arranged such that the fuel is injected toward a position at a boundary of the lip portion and the periphery concave portion in a case where the piston is near a compression TDC, wherein an amount of fuel in a main injection which starts near the compression TDC being set to 1 to 5 mm³ where an engine load is within a certain operating range, and an amount of fuel in the main injection being set to 10 to 30 mm³ where the engine load is higher than said certain operating range, wherein the periphery concave portion has an arc shape, wherein the lip portion is formed continuously from the periphery concave portion, and wherein the lip portion has an arc shape.

2. The diesel engine of claim 1, wherein the nozzle hole diameter D is designed to be 0.1±0.015 mm.

3. A method for use in designing a diesel engine, the diesel engine including a piston for reciprocating inside a cylinder, a cylinder head covering an end surface of the cylinder from a side opposing to a crown surface of the piston, and a fuel injector attached to the cylinder head, wherein the fuel injector has a valve body into which fuel is introduced, and a plurality of nozzle holes are bored into a tip part of the valve body that is an end part of the valve body on a piston side, wherein the fuel is injected through the plurality of nozzle holes from an inside of the valve body toward the piston, wherein a cavity having a circular shape in a plan view is formed in the crown surface of the piston to concave at an opposite side from the cylinder head so as to be able to receive the fuel injected from the fuel injector at least when the piston is at a top dead center, wherein a wall surface constituting the cavity has a central ridge portion bulging toward the fuel injector as well as bulging larger toward the center of the cavity, a periphery concave portion formed outward of the central ridge portion in a radial direction of the piston and formed to concave radially outward in a vertical cross-sectional view, and a lip portion formed between the periphery concave portion and the crown surface of the piston and formed to convex radially inward in the vertical cross-sectional view, the method comprising:

defining a lip radius R (mm), a nozzle hole length L (mm), a nozzle hole diameter D (mm), and a bore radius B (mm) to have a relationship described by Equation 1, the lip radius R (mm) being a distance taken in a direction perpendicular to a central axis of the tip part of the fuel injector from the central axis to a part of the lip portion protruding the furthest radially inward, the nozzle hole length L (mm) being a length of each of the nozzle holes in an axial direction of the nozzle hole from an inner surface of the valve body to an outer surface of the valve body, and the nozzle hole length L being in a range from 0.5 mm to 0.7 mm, the nozzle hole diameter D (mm) being a diameter of the nozzle holes, the bore radius B (mm) being a radius of the cylinder, and Equation 1 being expressed as follows:

$$99.4D \times (1-3D) \times (L+2.7) \leq R \leq \min\{237.1D \times (1-3D) \times (0.8L+1), 2B/3\} \quad (1)$$

wherein the fuel injector being arranged such that the fuel is injected toward a position at a boundary of the lip portion and the periphery concave portion in a case where the piston is near a compression TDC, wherein an amount of fuel in a main injection which starts near the compression TDC is set to 1 to 5 mm³ where an engine load is within a certain operating range, and an amount of fuel in the main injection is set to 10 to 30 mm³ where the engine load is higher than said certain operating range, wherein the periphery concave portion has an arc shape, wherein the lip portion is formed continuously from the periphery concave portion, and wherein the lip portion has an arc shape.

4. The method of claim 3, further comprising defining the nozzle hole diameter D to be 0.1±0.015 mm.

* * * * *